United States Patent
Shiozaki

(10) Patent No.: US 9,537,693 B2
(45) Date of Patent: Jan. 3, 2017

(54) CIRCUIT DEVICE HAVING TWO COMMUNICATION INTERFACES FOR FASTER AND SLOWER TRANSMISSION SPEEDS, AND TRANSMISSION MODULE, ELECTRONIC APPARATUS, AND MOVING OBJECT THAT HAVE THE CIRCUIT DEVICE

(71) Applicant: Seiko Epson Corporation, Tokyo (JP)

(72) Inventor: Nobutaka Shiozaki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/801,189

(22) Filed: Jul. 16, 2015

(65) Prior Publication Data

US 2016/0020927 A1    Jan. 21, 2016

(30) Foreign Application Priority Data

Jul. 18, 2014 (JP) ................................ 2014-147882

(51) Int. Cl.
*H04L 25/02* (2006.01)
*H04L 27/12* (2006.01)
*H04B 1/04* (2006.01)

(52) U.S. Cl.
CPC ........... *H04L 27/127* (2013.01); *H04L 25/028* (2013.01)

(58) Field of Classification Search
CPC .. H04L 25/0272; H04L 27/127; H04L 25/028; G06F 13/1668; Y02B 60/1228
See application file for complete search history.

(56) References Cited

U.S. PATENT DOCUMENTS

2004/0093450 A1* 5/2004 Andreas .............. G06F 13/4291
710/110
2005/0243940 A1* 11/2005 Huh ...................... H04L 25/022
375/260

(Continued)

FOREIGN PATENT DOCUMENTS

JP        H07-162238 A    6/1995
JP        H07-240697 A    9/1995

(Continued)

OTHER PUBLICATIONS

TDA5150, Multichannel/Multiband RF Transmitter for 300-928 MHz bands On-chip, high resolution fractional-N synthesizer and Sigma-Delta modulator with ASK, FSK, GFSK options, Infineon, V1.1, Jun. 2012.*

(Continued)

*Primary Examiner* — Aristocratis Fotakis
(74) *Attorney, Agent, or Firm* — Harness, Dickey & Pierce, P.L.C.

(57) ABSTRACT

To provide different paths for communication of a serial signal required for high-speed communication and communication of transmission data that may be handled in low-speed communication, a circuit device includes a serial interface that receives a serial signal transmitted from a controller at a first communication speed, a transmission data input terminal that receives transmission data transmitted from the controller at a second communication speed slower than the first communication speed, and a transmission circuit that outputs a transmission signal corresponding to the transmission data based on the serial signal and the transmission data.

16 Claims, 13 Drawing Sheets

(56) References Cited

U.S. PATENT DOCUMENTS

| | | | |
|---|---|---|---|
| 2006/0211390 A1 | 9/2006 | Uozumi et al. | |
| 2009/0098834 A1* | 4/2009 | Yoshida et al. | 455/76 |
| 2009/0177816 A1* | 7/2009 | Marx | G06F 13/1668 710/72 |
| 2012/0019328 A1* | 1/2012 | Shibata et al. | 331/34 |
| 2013/0073810 A1* | 3/2013 | Alon | G06F 13/1663 711/137 |
| 2015/0177326 A1* | 6/2015 | Chakraborty et al. | |

FOREIGN PATENT DOCUMENTS

| | | |
|---|---|---|
| JP | 08-037472 | 2/1996 |
| JP | H11-168405 A | 6/1999 |
| JP | 2006-261714 A | 9/2006 |

OTHER PUBLICATIONS

TDA5225, Enhanced Sensitivity Multi-Channel Quad-Configuration Receiver with Digital Slicer, V1.0, Infineon, Feb. 2010.*
OL2300-Fractional-N PLL based transmitter, Rev. 2—Oct. 28, 2010.*

* cited by examiner

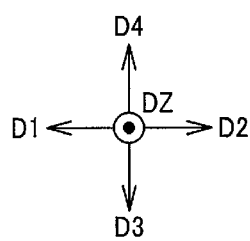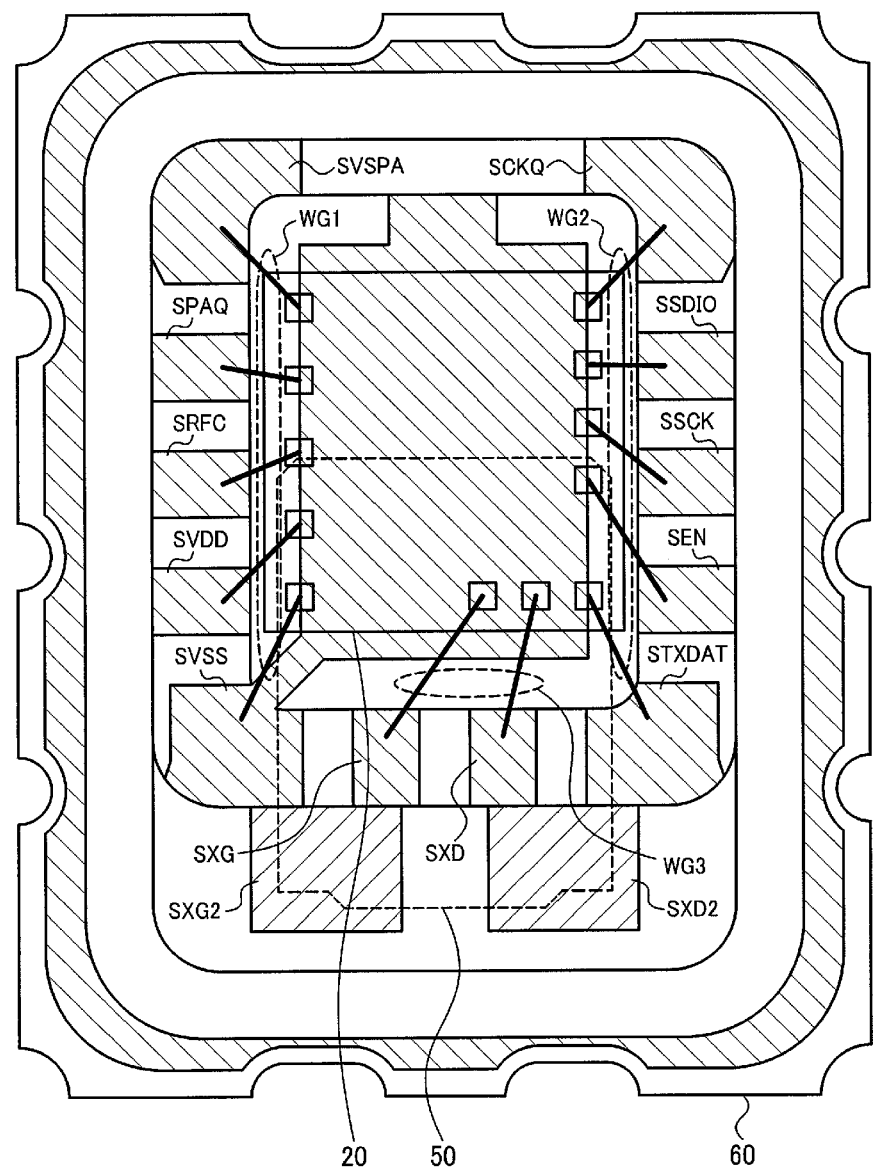
FIG. 10

CIRCUIT DEVICE HAVING TWO COMMUNICATION INTERFACES FOR FASTER AND SLOWER TRANSMISSION SPEEDS, AND TRANSMISSION MODULE, ELECTRONIC APPARATUS, AND MOVING OBJECT THAT HAVE THE CIRCUIT DEVICE

BACKGROUND

1. Technical Field

The present invention relates, for example, to a circuit device, a transmission module, an electronic apparatus, and a moving object.

2. Related Art

There is a known RF transmitter that outputs a transmission signal in an RF band, such as an automobile keyless entry module (key side). In an apparatus of this type, a communication circuit device (semiconductor integrated circuit or IC, for example) is controlled by a control IC (controller, microcomputer) to generate and output the transmission signal.

For example, JP-2006-261714 discloses a circuit device having an interface with a control IC (baseband IC), uses a fractional-N-type PLL circuit (PLL circuit having sigma-delta modulator) to generate a carrier wave signal, and uses a power amplifier to drive an antenna for wireless communication.

The circuit device receives the following two pieces of information from the controller: information for setting the frequency of the carrier wave, a modulation method, and other factors (transmission action setting information); and transmission data to be actually transmitted on a transmission signal in an RF band. Since a desired transmission signal cannot be generated without the transmission action setting information, it is required to receive the transmission action setting information at highest possible speed at timing before transmission starts. On the other hand, the transmission data communication speed is restricted by an implemented apparatus that receives the transmission signal (a receiver in an automobile in the case of a keyless entry module), and a communication speed of about several kHz typically suffices. That is, a plurality of pieces of information are transmitted and received to and from the circuit device and the controller at different desirable transmission speeds.

In JP-2006-261714, the communication between the controller and the circuit device is performed by three-line serial communication, and action setting communication (communication of transmission action setting information) and RF transmission data communication (communication of transmission data), which are desirably performed at different transmission speeds, are performed by single serial communication. The communication therefore needs to be performed in accordance with the transmission rate in the slow communication, resulting in inefficient communication.

SUMMARY

An advantage of some aspects of the invention is to provide a circuit device that provides different paths for communication of a serial signal that requires high-speed communication and communication of transmission data that may be handled in low-speed communication to achieve efficient communication, and to further provide a transmission module, an electronic apparatus, and a moving object.

Application Example 1

This application example relates to a circuit device including a serial interface that receives a serial signal transmitted from a controller at a first communication speed, a transmission data input terminal that receives transmission data transmitted from the controller at a second communication speed slower than the first communication speed, and a transmission circuit that outputs a transmission signal corresponding to the transmission data based on the serial signal and the transmission data.

In this application example, the serial signal (transmission action setting information in a narrow sense) is received at the first communication speed, which is relatively fast, by the serial interface, and the transmission data is received at the second communication speed, which is relatively slow, via the input terminal. Two communication paths along which communication is performed at different speeds can therefore be provided, whereby efficient communication according to information to be received is achieved.

Application Example 2

In this application example, the circuit device may further include an oscillation circuit that generates an oscillation clock signal for generating a transmission clock signal for the transmission signal, and the first serial interface may receive the serial signal from the controller in an oscillation activation period of the oscillation circuit.

In the configuration described above, receiving the serial signal at appropriate timing allows efficient communication.

Application Example 3

In this application example, the oscillation circuit may include a capacitance circuit for oscillation, and the capacitance of the capacitance circuit for oscillation in the oscillation circuit may be set to be smaller than capacitance in normal operation in the oscillation activation period.

The configuration described above allows an oscillation piece connected to the oscillation circuit to quickly oscillate.

Application Example 4

In this application example, the oscillation circuit may include a buffer, and current supply performance of the buffer provided in the oscillation circuit may be set to be greater than current supply performance in normal operation in the oscillation activation period.

The configuration described above allows the oscillation piece connected to the oscillation circuit to quickly oscillate.

Application Example 5

In this application example, the oscillation circuit may cause an oscillation piece accommodated in a single package along with the oscillation circuit to oscillate.

In the configuration described above, the characteristics of the oscillation piece are known, whereby the oscillation circuit can be controlled in accordance with the characteristics of the oscillation piece.

Application Example 6

In this application example, the circuit device may further include a second serial interface that receives the transmission data via the input terminal.

The configuration described above allows an interface for receiving the transmission data to be provided.

Application Example 7

In this application example, when the serial interface receives from the controller a transmission start instruction to start transmitting the transmission data, the second serial interface may receive the transmission data.

The configuration described above allows execution of a sequence in which the second serial interface starts receiving the transmission data in response to reception of the transmission start instruction at the serial interface.

Application Example 8

In this application example, the serial interface may receive a transmission command from the controller to detect the transmission start instruction.

The configuration described above allows detection of the transmission start instruction at timing after the reception of the transmission command.

Application Example 9

In this application example, the second serial interface may receive the transmission data in a synchronous mode in some cases and may receive the transmission data in an asynchronous mode in other cases.

The configuration described above allows reception of the transmission data in the synchronous communication in some cases and reception of the transmission data in the asynchronous communication in other cases.

Application Example 10

In this application example, the transmission circuit may include a transmission waveform generator that generates a transmission waveform based on transmission action setting information received in the form of the serial signal and the transmission data and a power amplifier that outputs the transmission signal having the generated transmission waveform.

The configuration described above allows the transmission signal having the transmission waveform generated by the transmission waveform generator to be outputted via the power amplifier.

Application Example 11

In this application example, the circuit device may further include a setting register to which the transmission action setting information received in the form of the serial signal is written.

The configuration described above allows the transmission action setting information received by the serial interface to be held or otherwise stored in the setting register.

Application Example 12

In this application example, the transmission action setting information received in the form of the serial signal may be information that allows setting at least one of the frequency of a transmission clock signal for the transmission signal and a modulation method used to generate the transmission signal.

In the configuration described above, reception of the transmission action setting information allows setting of at least one of the frequency of the transmission clock signal and the modulation method.

Application Example 13

Another application example of the invention relates to a transmission module including the circuit device and the controller described above, and the controller has an output terminal connected to the input terminal.

Application Example 14

Another application example of the invention relates to an electronic apparatus including the circuit device described above.

Application Example 15

Another application example of the invention relates to a moving object including the circuit device described above.

BRIEF DESCRIPTION OF THE DRAWINGS

The invention will be described with reference to the accompanying drawings, wherein like numbers reference like elements.

FIG. 10 shows a detailed configuration example of a package in which an oscillation piece and the circuit device are incorporated.

DESCRIPTION OF EXEMPLARY EMBODIMENTS

Figure 1:
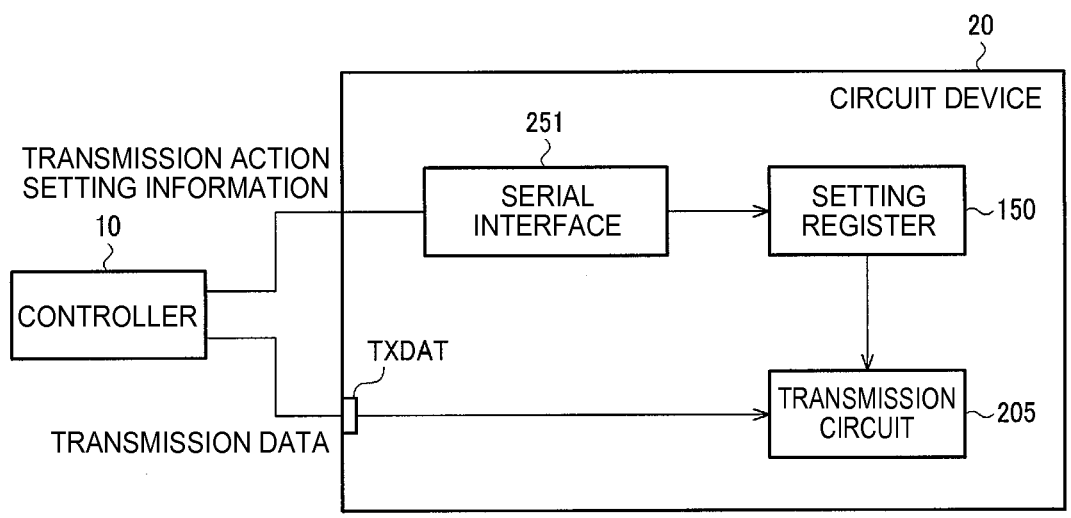
FIG. 1 shows a basic configuration example of a circuit device according to an embodiment of the invention.

A preferable embodiment of the invention will be described below in detail. It is not intended that the present embodiment described below unduly limits the contents of the invention set forth in the appended claims, and all configurations described in the present embodiment are not necessarily essential to achieve the advantage of the invention.

1. Method According to Present Embodiment

A method according to the present embodiment will first be described. A circuit device that outputs a transmission signal in an RF band communicates with a controller (microcomputer) for operation, as described above. Specifically, the circuit device needs to receive transmission data to be transmitted to a receiver by using a transmission signal and also needs to receive transmission action setting information for setting the frequency of a carrier wave used to generate the transmission signal, a modulation method, and a variety of other factors.

In this process, since a desired transmission signal cannot be generated without the transmission action setting information, it is required to receive the transmission action setting information at highest possible speed (at a rate of several MHz, for example) at timing before transmission starts. On the other hand, the transmission data communication speed is restricted by an implemented apparatus that receives the transmission signal (a receiver in an automobile in the case of a keyless entry module), and a communication speed of about several kHz typically suffices. That is, a plurality of pieces of information are transmitted and received to and from the circuit device and the controller at different desirable transmission speeds.

In JP-2006-261714, however, a three-line serial interface (SPI: serial peripheral interface) is used to perform not only communication of the transmission action setting information but also communication of transmission data. The transmission data communication speed is restricted by an implemented apparatus that receives a transmission signal, as described above. An use case of the circuit device assumed herein is a case where a user who has purchased the circuit device also provides a controller (also manufactures a controller or separately purchases a controller that satisfies required conditions) to achieve an electronic apparatus or a moving object that will be described later with reference to FIGS. 12 and 13. That is, to output transmission data to a receiver at a communication speed desired by the user, the speed at which the transmission data is transmitted and received to and from the controller and the circuit device may be set based on a communication speed determined by the restriction described above. The reason for this is that the transmission method described above allows the circuit device to output an RF-band transmission signal carrying received transmission data as it is so that the user can implement, select, and otherwise design the controller in a more flexible manner.

In view of the point described above, communication using a serial interface between the circuit device and the controller is set with reference to the transmission data communication speed, which is the slower communication speed. The communication of the transmission action setting information is therefore also performed, for example, at a rate of several kHz, resulting in inefficient communication. Specifically, it takes time for the circuit device to receive the transmission action setting information.

Consider an automobile keyless entry module as an example that is easy to understand. A circuit device that outputs a transmission signal in an RF band is compact and lightweight and used in an electronic apparatus that is assumed to be hand-carried in many cases. In these cases, since the electronic apparatus is driven with a battery or any other secondary cell, power saving is an important issue. The circuit device according to the present embodiment is therefore desirably activated in a necessary situation, for example, when data is transmitted, and powered off in the other situations. Further, to achieve efficient power saving based on the control described above, the time required to transmit data may be minimized. The reason for this is that a long time per communication operation results in a high ratio of the time during which the circuit device is active.

As will be described later with reference to FIG. 6, the circuit device transitions through several states before it completes output of a transmission signal. Among the states shown in FIG. 6, a segment labeled with "Transmitter Active" is time during which transmission data received from the controller and carried by the transmission signal is outputted. The time is not readily shortened as long as the transmission data communication speed is restricted as described above. In contrast, if the time for transmitting the transmission action setting information can be shortened, the period of "ATOSC-Active," which is one of preparation phases for communication, can be shortened. That is, high-speed communication of the transmission action setting information is important from a viewpoint of efficient communication, particularly, power saving, but it is difficult to achieve the purpose based on the method described in JP-2006-261714.

In view of the fact described above, the present applicant proposes a method for providing different communication paths for communication of the transmission action setting information and communication of transmission data. Specifically, a circuit device 20 according to the present embodiment includes a serial interface 251, which receives a serial signal transmitted from a controller 10 at a first communication speed, a transmission data input terminal TXDAT, which receives transmission data transmitted from the controller 10 at a second communication speed that is slower than the first communication speed, and a transmission circuit 205, which outputs a transmission signal corresponding to the transmission data based on the serial signal and the transmission data, as shown in FIG. 1.

In the configuration described above, the transmission action setting information, which is desired to be handled in high-speed communication, is received in the form of a serial signal by using the relatively high-speed serial interface 251, and communication of transmission data, which is handled in low-speed communication due to the restriction described above, can be performed via the relatively low-speed input terminal TXDAT. The two types of communication can therefore be performed at communication speeds according to communication target information, whereby efficient communication is achieved. In particular, since the transmission action setting information can be handled in high-speed communication (several MHz), the time required for data transmission can be shortened, electric power consumed by the circuit device 20 can be lowered, and other advantages can be provided. A specific example of the information carried by the serial signal is the transmission action setting information as described above, but the serial signal does not necessarily carry the transmission action setting information and may carry a variety of other types of information that can be received by the serial interface 251 and desired to be handled in relatively high-speed communication. The following description will be made by assuming that the transmission action setting information is received in the form of a serial signal, and it is conceivable in an extended manner that the transmission action setting information is received in the form of any other serial signal.

The transmission signal used herein may be a signal in an RF band. The term RF (radio frequency) used herein represents an electromagnetic wave or an electric signal having a frequency used in wireless communication. Specifically, since frequencies ranging from about 300 Hz to 3 THz can be used in wireless communication, the RF-band transmission signal according to the present embodiment is a signal having a frequency that falls within the range described above. Since the frequency used in wireless communication is also restricted, for example, by wireless communication standards, the frequency of the transmission signal in the present embodiment is determined in accordance with associated situations.

A conceivable comparative example to be compared with the method according to the present embodiment is a method for switching the baud rate (communication rate) in the controller. For example, the controller may be provided with a first prescaler formed of a first register and a first counter and a second prescaler formed of a second register and a second counter. When the first prescaler has a small division ratio and the second prescaler has a large division ratio, the communication using the first prescaler is performed at high speed and the communication using the second prescaler is performed at low speed. Using the thus configured first prescaler for the communication of the transmission action setting information and using the thus configured second prescaler for the communication of transmission data allows communication at a speed suitable for the two types of information. The baud rate can be switched in a variety of different manners. For example, the two prescalers can use a common register, and a value written to the register can be switched.

However, every controller is not configured to switch the baud rate. The user who provides a controller therefore needs to select a controller capable of switching the baud rate, resulting in narrow room for selection of the controller.

Specifically, communication using a serial interface (SPI, in particular) is assumed in the first place to perform high-speed communication on the order of several MHz. The above description has been made by assuming that SPI is used to perform communication at several kHz because the restriction on the transmission data communication speed due to an implemented apparatus that receives a transmission signal is present as described above. When communication in an RF band is considered, use of SPI is intended to perform communication at a speed about several to a thousand times higher than the communication speed of several kHz. Therefore, to switch the baud rate, it is necessary to use a prescaler that lowers a communication speed on the order of MHz, which is a typically assumed communication speed, to a communication speed on the order of kHz, that is, a prescaler that has a very high division ratio (that performs 1000-division operation, for example). A controller that does not include a prescaler having such a high division ratio cannot therefore perform the baud rate switching described above in the first place. On the other hand, to allow the switching described above, it is necessary to implement a prescaler having a very high division ratio in the controller, resulting in a large burden on the circuit configuration of the controller.

That is, since the comparative example in which the bard rate is switched still has a problem with achievement of efficient communication, different communication paths for the communication of the transmission action setting information and the communication of transmission data are provided in the present embodiment.

A specific configuration example of the circuit device according to the present embodiment will be described below, and the sequence of communication between the controller and the circuit device will next be described in detail. Further, configuration and action examples of an oscillation circuit provided in the circuit device will be described in detail, and an example in which an oscillation piece caused to oscillate by the oscillation circuit is integrated with the circuit device according to the present embodiment into a single package will next be described. Thereafter, a setting register will be described, and another example to which the method according to the present embodiment is applicable will next be described.

2. Configuration Example of Circuit Device

Figure 2:
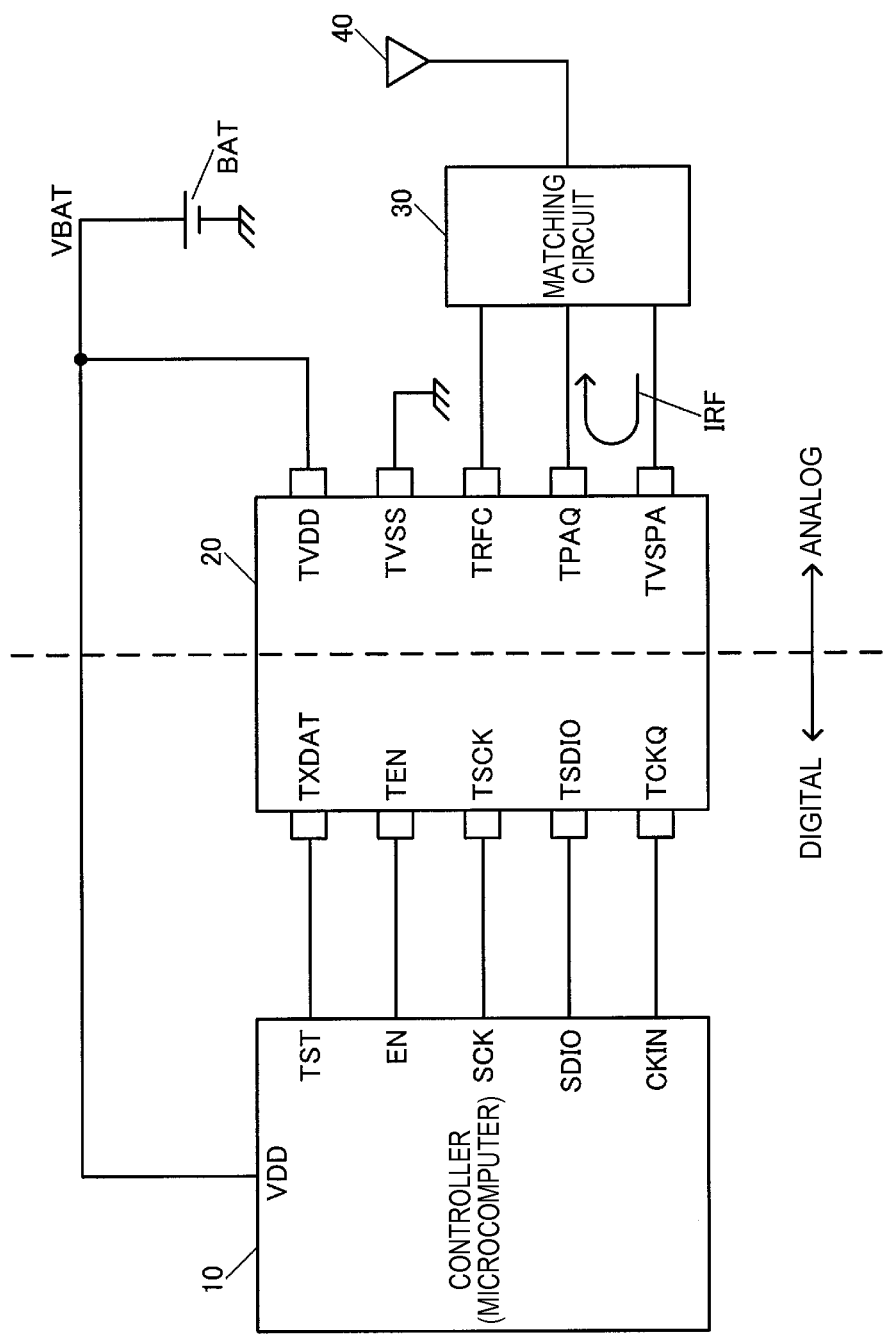
FIG. 2 shows a configuration example of a system in which the circuit device according to the present embodiment is used.

FIG. 2 shows a configuration example of a system in which the circuit device according to the present embodiment is used. The system shown in FIG. 2 includes the controller 10, the circuit device 20, a matching circuit 30, an antenna 40, and a battery BAT (power supply, battery). The system is, for example, a wireless transmitter (RF transmitter).

The circuit device 20 is a device that generates a wireless transmission signal (transmission signal in RF band) and wirelessly transmits the signal via the matching circuit 30 and the antenna 40 under the control of the controller 10. Specifically, a quartz oscillator (oscillation piece 50 in a narrow sense, which is integrated with the circuit device 20 into a single package, as will be described later) is connected to the circuit device 20, and an oscillation circuit 100 built in the circuit device 20 causes the oscillation piece 50 to oscillate. The circuit device 20 may supply the controller 10 with a clock signal generated from an oscillation signal to the oscillation circuit 100 via a terminal TCKQ.

The controller 10 operates based on the clock signal and inputs and outputs control signals and wireless transmission data via an enable terminal TEN, a data input/output terminal TSDIO, and a data input/output clock terminal TSCK of the circuit device 20.

The circuit device 20 multiplies the oscillation signal in a PLL circuit 210 to generate a carrier wave signal for the wireless communication, modulates the carrier wave signal based on transmission data to generate a transmission signal, and outputs the transmission signal via output terminals (wireless transmission terminals), such as TRFC and TPAQ. The matching circuit 30 is a circuit that performs impedance matching between the circuit device 20 and the antenna 40. The transmission signal is transmitted via the matching circuit 30 and out of the antenna 40.

In the example shown in FIG. 2, among a plurality of terminals of the circuit device 20, TVDD, TVSS, TRFC, TPAQ, and TVSPA, which are analog terminals, are provided along a first side in a first direction, and TXDAT, TEN, TSCK, TSDIO, and TCKQ, which are digital terminals, are provided along a second side in a second direction that is the direction opposite the first direction.

In this case, the controller 10 is so implemented that it faces the side of the circuit device 20 along which the digital terminals thereof are provided. On the other hand, the matching circuit 30 and the antenna 40 (pattern antenna formed of a wiring pattern on a printed circuit board, for example) are so implemented that they face the side of the circuit device 20 along which the analog terminals thereof are provided.

The implementation arrangement described above is achieved by the separation of the digital terminals and the analog terminals along the two sides. That is, in the entire region from the circuit device 20 to an implementation substrate outside the package, a digital portion and an analog portion can be clearly separated from each other (separated as left and right sides in FIG. 2). Further, wiring lines on the implementation substrate are simply connected from the controller 10 to the digital terminals along the side facing the controller 10 and from the matching circuit 30 to the analog terminals along the side facing the matching circuit 30, whereby the wiring line are routed very simply on the implementation substrate. The configuration shown in FIG. 2 therefore allows construction of a wireless communication system that hardly allows crosstalk between the digital portion and the analog portion even though the size reduction typically tends to cause crosstalk.

It is, however, noted that the configurations of the circuit device 20 according to the present embodiment and the system including the circuit device 20 are not limited to those shown in FIG. 2 and can be embodied in a variety of different manners.

Figure 3:
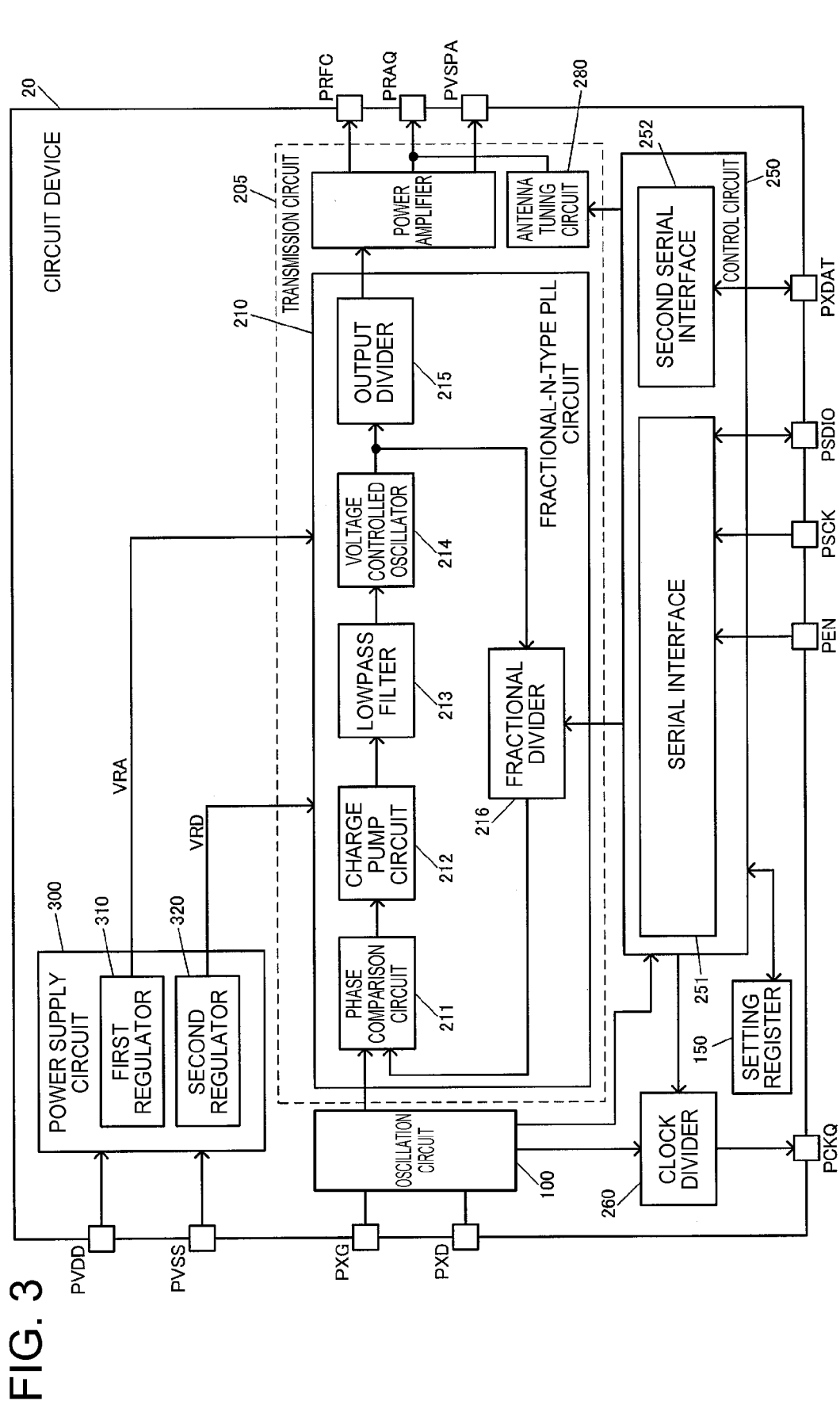
FIG. 3 is a functional block diagram of a detailed configuration example of the circuit device.

FIG. 3 is a functional block diagram of a detailed configuration example of the circuit device 20. The circuit device 20 includes the oscillation circuit 100 for the oscillation piece and the transmission circuit 205, which performs wireless communication processing based on the oscillation signal from the oscillation circuit 100. The transmission circuit 205 includes a transmission waveform generator that generates a transmission waveform based on the transmission action setting information received in the form of the serial signal and transmission data, and a power amplifier 220, which outputs a transmission signal having the generated transmission waveform. The transmission waveform generator can be achieved by a fractional-N-type PLL circuit 210 (hereinafter also referred to as PLL circuit 210), as shown in FIG. 3. The transmission circuit 205 may include an antenna tuning circuit 280, as shown in FIG. 3.

The circuit device 20 further includes a control circuit 250. The control circuit 250 includes the serial interface 251 and a second serial interface 252, as shown in FIG. 3. The circuit device 20 further includes a clock divider 260 and a power supply circuit 300.

The PLL circuit 210 performs fraction multiplication (including integer multiplication) of a reference clock signal that is the oscillation signal from the oscillation circuit 100 to generate a carrier wave signal and modulates the carrier wave signal to generate the transmission signal.

Specifically, the PLL circuit 210 includes a phase comparison circuit 211, a charge pump circuit 212, a lowpass filter 213, a voltage controlled oscillator 214 (VCO), an output divider 215, and a fractional divider 216 (feedback divider).

The phase comparison circuit 211 compares the phase of a PLL oscillation signal fed back via the fractional divider 216 with the phase of the reference clock to output a voltage signal based on the phase difference. The charge pump circuit 212 converts the voltage signal from the phase comparison circuit 211 into a current signal. The lowpass filter 213 converts the current signal from the charge pump circuit 212 into a voltage signal and performs lowpass filtering. The voltage controlled oscillator 214 oscillates at a frequency according to the voltage value from the lowpass filter 213. The fractional divider 216 divides the PLL oscillation signal from the voltage controlled oscillator 214 by using a fractional (integer+decimal) division ratio. The fractional division allows fractional multiplication of the reference clock.

The fractional division ratio is obtained, for example, as follows: That is, the fractional divider 216 has a divider capable of switching of a plurality of integer division ratios to another and a delta-sigma modulator. The delta-sigma modulator uses delta-sigma modulation to generate a switching signal that provides a desired fractional average and uses the switching signal to switch any of the plurality of integer division ratios to another. For example, when the switching is performed between N division and (N+1) division at a cycle of 1:1, the average of fractional division ratios is N+0.5.

The output divider 215 divides the PLL oscillation signal from the voltage controlled oscillator 214 and outputs the divided signal as the transmission signal. That is, the frequency of the signal outputted by the output divider 215 is the frequency of the carrier wave.

To perform wireless communication, it is necessary to modulate the carrier wave described above. The modulation is performed, for example, as follows: That is, the control circuit 250 receives transmission data from the controller 10 and modulates the division ratio used by the fractional divider 216 based on the transmission data. The PLL oscillation frequency (multiplication factor) is thus modulated, whereby wireless communication based on what is called FSK modulation can be performed.

In wireless communication, the frequency that can be used in communication varies, for example, in accordance with a relevant law in each country. It has therefore been necessary to generate a large number of carrier waves having different frequencies, and quartz oscillators that oscillate at different frequencies have been combined with one another and used in correspondence with the frequency of the carrier wave. The combination requires use of quartz oscillators external to the circuit device. In this regard, in the present embodiment, using the fractional-N-type PLL circuit 210 allows generation of a large number of carrier waves having different frequencies based on the fractional multiplication even when a quartz oscillator that oscillate at a single frequency is used. As a result, the oscillation piece 50 and the circuit device 20 can be integrated into a single package, as will be described with reference to FIGS. 10 and 11.

The circuit device 20 further includes a setting register 150, as shown in FIG. 3. The setting register 150 is used for action setting and control. Writing data to the setting register 150 and reading data from the setting register 150 are performed by using communication via the serial interface 251 (communication using SPI in a narrow sense). The communication via the serial interface 251 is not necessarily used only to write and read data to and from the setting register 150 and is used, for example, to receive a transmission command. The transmission command will be described later in detail.

Figure 4A:
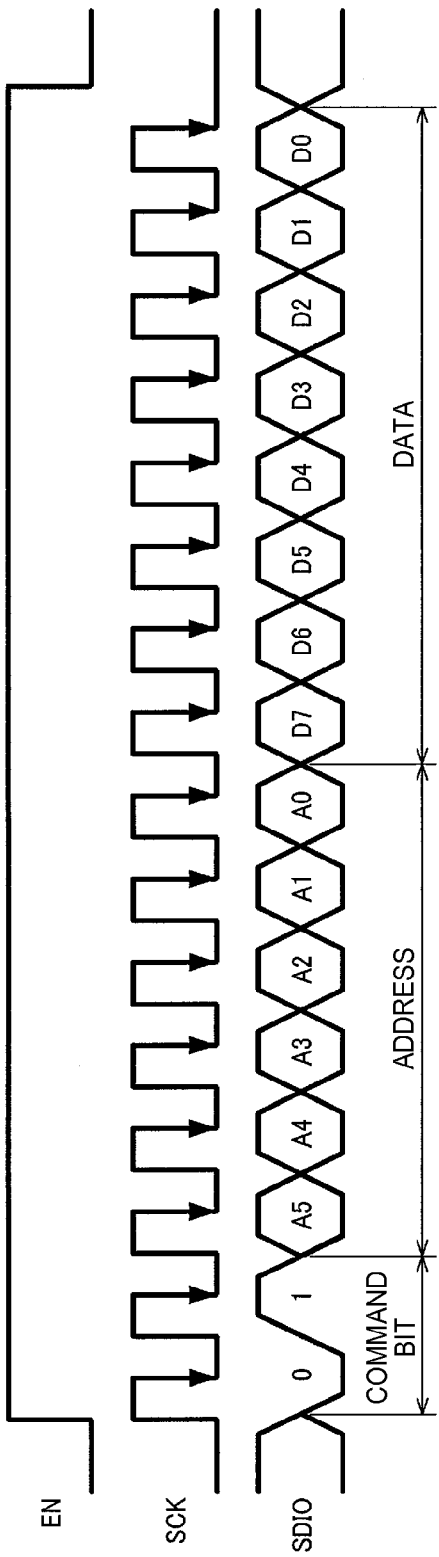
FIG. 4A shows an example of control timing in a case where data is written to a setting register by using SPI.
Figure 4B:
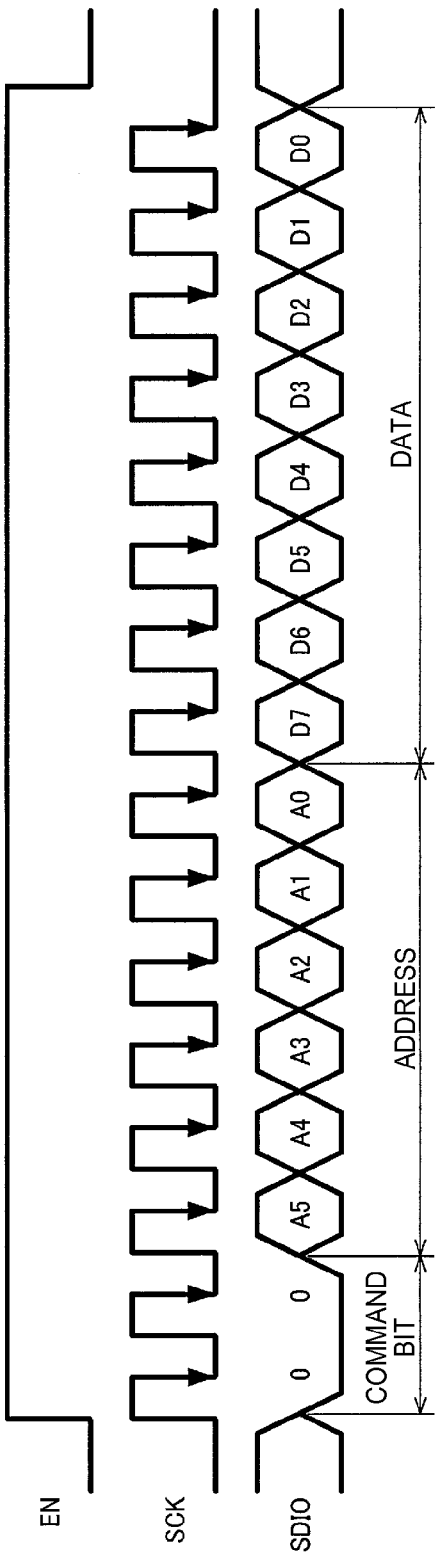
FIG. 4B shows an example of control timing in a case where data is read from the setting register by using SPI.

Data held in the setting register 150 will be described later in detail, and a description will next be made of control timing at which data is written and read to and from the setting register 150 with reference to FIGS. 4A and 4B. FIG. 4A shows the control timing in a case where data is written to the setting register 150 via SPI, and FIG. 4B shows the control timing in a case where data is read from the setting register 150 via SPI.

The data writing is synchronized with a falling edge of a serial clock SCK (signal received through terminal TSCK). Specifically, the serial interface 251 receives a two-bit command bit in synchronization with the serial clock SCK after EN (Enable signal, signal received through terminal TEN) rises. Specifically, out of a signal SDIO transmitted and received through the terminal TSDIO, two bits labeled with "01" in FIG. 4A form the command bit. FIG. 4A shows a case where a writing command that commands writing data to the setting register 150 is "01". After the command bit, a 6-bit address in the setting register 150 to which data is desired to be written is received from the controller 10. The address corresponds to A5 to A0 in FIG. 4A. 8-bit data that is desired to be written to the address represented by A5 to A0 is subsequently received. In the example shown in FIG. 4A, D7 to D0 form the data to be written. In the circuit device 20, data is written to the setting register 150 under the control described above.

On the other hand, the data reading is synchronized with a falling edge of the serial clock SCK. As shown in FIG. 4B, a 2-bit command bit is first received, and a 6-bit address in the setting register 150 from which data is desired to be read is then received also in the reading operation. FIG. 4B shows a case where a reading command that commands reading data from the setting register 150 is "00". The address corresponds to A5 to A0, as in FIG. 4A. After the address is transmitted, data in the specified address is read from the setting register 150, and the circuit device 20 transmits the data to the controller 10. In the example shown in FIG. 4B, data corresponding to D7 to D0 is read from the address corresponding to A5 to A0 in the setting register 150.

As will be seen from FIG. 3, the circuit device 20 includes the second serial interface 252, which receives transmission data via an input terminal TXDAT. The circuit device 20 can therefore receive data from the controller 10 by using a path different from the path for the serial communication using the serial interface 251 (communication using three-line serial interface in a narrow sense) via the terminals TSCK and TSDIO (pads PSCK and PSDIO). That is, receiving transmission data by using the input terminal TXDAT (pad PXDAT) and the second serial interface 252 allows the efficient communication as described above.

The second serial interface 252 receives transmission data in a synchronous mode or an asynchronous mode. That is, the second serial interface 252 may receive transmission data in synchronous communication or asynchronous communication. That is, an appropriate mode can be selected in accordance with associated situations.

Figure 5:
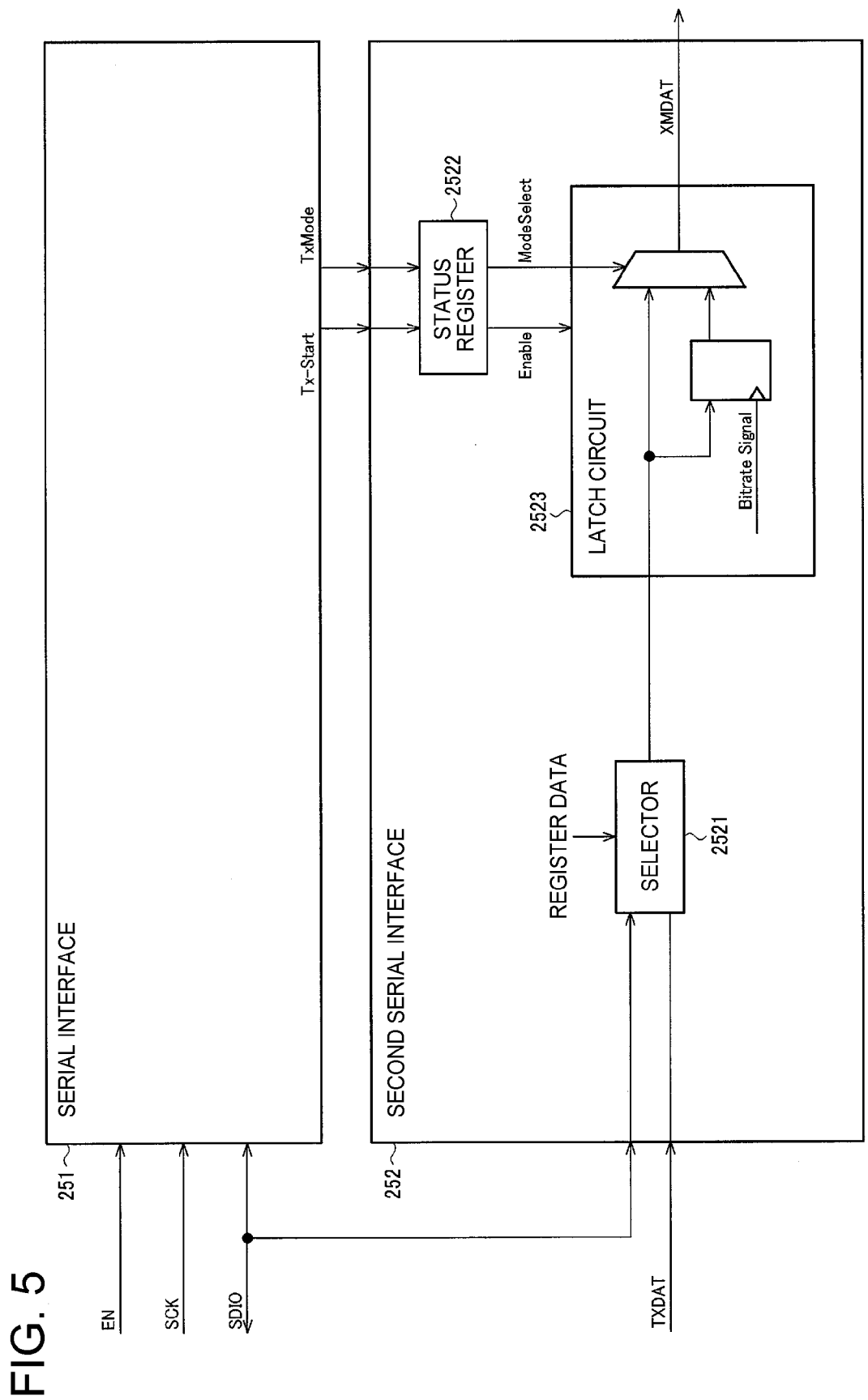
FIG. 5 shows a detailed configuration example of a second serial interface.

FIG. 5 shows a configuration example of the second serial interface 252. The second serial interface 252 includes a selector 2521, a status register 2522, and a latch circuit 2523. The selector 2521 accepts data through the terminal TSDIO, which is used to input data to the serial interface 251, and the input terminal TXDAT and selects one of the two types of data in accordance with the state of the setting register 150. As described above, TXDAT is basically selected in the present embodiment. In some cases, however, data received by using SPI may be carried and outputted by a transmission signal, as in a method of related art, such as the method described in JP-2006-261714. That is, the selector 2511 in FIG. 5 selects data through TXDAT in a mode in which transmission data is received through the input terminal TXDAT based on the method according to the present embodiment, whereas selecting the signal SDIO (signal received through terminal TSDIO) in a mode in which transmission data is received by using SPI as in a method of related art. Which mode is selected may be determined, for example, based on data for the selection stored in the setting register 150.

The status register 2522 then stores Tx-Start and TxMode inputted from the serial interface 251. Tx-Start is flag data representing start of transmission and is a signal that shows 1 when an edge of the serial clock (SCK), which will be specifically described later with reference to FIG. 6, is detected. TxMode is flag data that determines whether the data reception mode is the synchronous mode or the asynchronous mode and corresponds to a bit labeled with A in SDIO in the examples in FIGS. 7 and 8, which will be described later.

The latch circuit 2523 determines whether the output signal from the selector 2512 is directly outputted or the output signal is latched and then outputted. Specifically, when Enable signal is read from the status register 2522 based on Tx-Start, the latch circuit 2523 starts operating. The latch circuit 2523 then reads a ModeSelect flag, which is determined based on the TxMode signal, in the status register 2522. When the flag represents the asynchronous mode, the output signal from the selector 2521 is directly outputted. The term "asynchronous" used herein represents that the signal inputted from the controller 10 and outputted from the selector 2521 (TXDAT or SDIO signal) is not synchronized with the clock in the circuit device 20.

On the other hand, when the flag represents the synchronous mode, a transmission signal is generated from the latched signal. The clock signal for the latching operation may be generated by dividing the clock in the circuit device 20. In this case, precise communication can be performed. The clock signal is specifically Bitrate Signal, which will be described later with reference to FIG. 8. The TxMode signal may, for example, be information transmitted from the controller 10 to the serial interface 251 and transferred to the second serial interface 252 in response to the "transmission command" in FIG. 6. Detailed communication timing in the synchronous mode and the asynchronous mode (examples of temporal change in signal received from controller 10 at each terminal) will be described later with reference to FIGS. 7 and 8.

The second serial interface 252 outputs a signal XMDAT under the control described above. The signal XMDAT carries target data to be actually carried and outputted by a transmission signal and is a signal used to create the transmission signal (to modulate carrier wave). That is, XMDAT is a signal used to generate a transmission signal and outputted to the waveform generator in the transmission circuit 205 (for example, PLL circuit 210, more specifically, fractional divider 216).

In the example described above, four types of signals are conceivable as XMDAT: In a first case, the SDIO signal is used as it is: in a second case, the TXDAT signal is used as it is: in a third case, the SDIO signal is latched and the latched signal is used; and in a fourth case, the TXDAT signal is latched and the latched signal is used. Which case is used is determined in accordance with which terminal is used, the terminal TSDIO or the terminal TXDAT and which mode is used, the synchronous mode or the asynchronous mode, in the transmission data reception, as described above.

In FIG. 3, the power supply circuit 300 includes a first regulator 310, which supplies the analog circuit with an analog power supply voltage VRA, and a second regulator 320, which supplies the digital circuit with a digital power supply voltage VRD. The two types of regulator are employed in consideration of suppression of crosstalk (noise coupling) between the digital circuit and the analog circuit via the power supply voltages (power supply lines).

3. Sequence of Communication Between Controller and Circuit Device

To cause the circuit device 20 to output a transmission signal, the circuit device 20 needs to pass through several stages. Specifically, first, the circuit device 20 itself is enabled; second, the oscillation circuit 100 causes the oscillation piece 50 to oscillate to generate the reference clock; and third, the reference clock is used to cause the transmission waveform generator (PLL circuit 210) to generate and output a transmission waveform. The third stage described above is further divided as follows: That is, it is necessary to lock the carrier wave frequency (clock frequency) in the PLL circuit 210 at a desired value and then receive transmission data to generate a transmission waveform. Further, to generate the transmission waveform, it is necessary to acquire necessary information, such as the carrier wave frequency and the modulation method (that is, transmission action setting information), before the generation of the transmission waveform.

Figure 6:
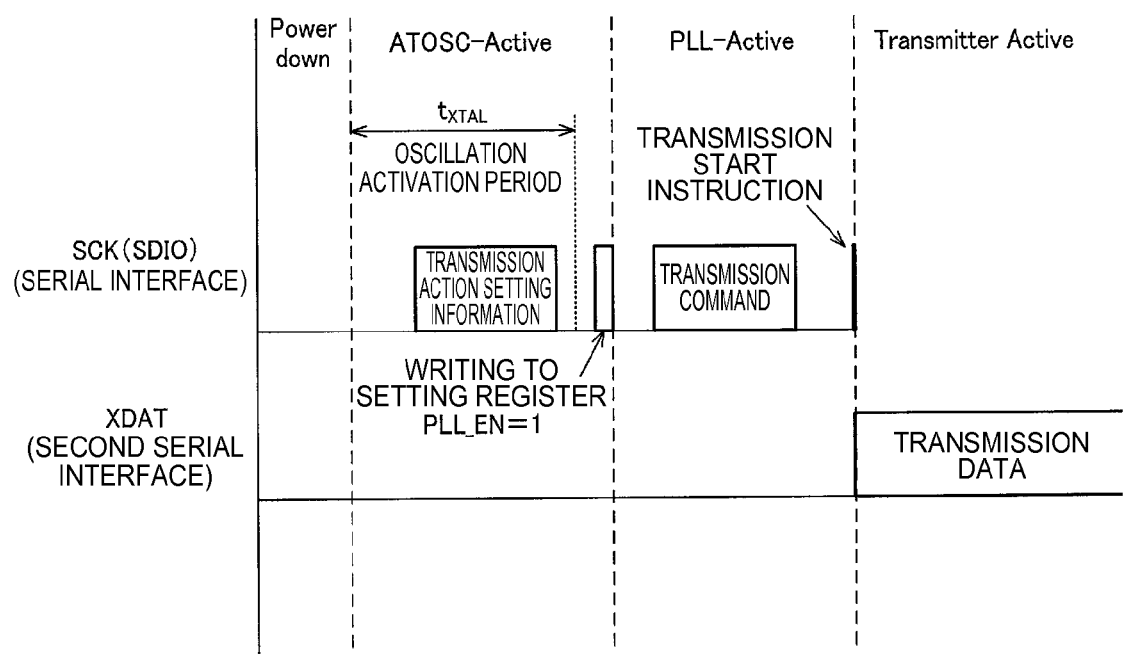
FIG. 6 describes the sequence of communication between the circuit device and a controller.

FIG. 6 shows the sequence of communication between the controller 10 and the circuit device 20 in consideration of the points described above. The horizontal axis in FIG. 6 represents lapse of time. As shown in FIG. 6, the following four phases are set: Power down is a state in which only minimum necessary circuits in the circuit device 20 are allowed to operate so that minimum current consumption is therefore consumed; ATOSC-Active is a state in which the oscillation circuit 100 causes the oscillation piece to oscillate; PLL-Active is a state in which the PLL circuit 210 is in operation; and Transmitter Active is a state in which a transmission signal is actually outputted. FIG. 6 shows a signal received by the serial interface 251 (communication using SPI) and a signal received by the second serial interface 252 in each of the states.

First, when Enable signal (signal through terminal EN) is inputted in the Power down state, the circuit device 20 transitions to ATOSC-Active. Specifically, after Enable signal is received, reference voltages are supplied via the regulators based on the power supply voltages, and the oscillation circuit 100 causes the oscillation piece 50 to start oscillating. The oscillation piece 50 requires predetermined time to oscillate, and the time is called an oscillation activation period $t_{XTAL}$ in the present embodiment. The period $t_{XTAL}$ for example, about 500 µsec.

To allow the PLL circuit 210 to generate an appropriate transmission waveform, the oscillation circuit 100 needs to cause the oscillation piece 50 to oscillate at a predetermined frequency, that is, the oscillation circuit 100 needs to supply the oscillation piece 50 with the reference clock having the predetermined frequency. To this end, the transition from ATOSC-Active to PLL-Active needs to occur at least after $t_{XTAL}$ elapses.

Even during the period $t_{XTAL}$, the serial communication using the serial interface 251 can be performed. That is, receiving the transmission action setting information, which is information for the PLL action, during the oscillation activation period $t_{XTAL}$ allows efficient action. Specifically, the circuit device 20 according to the present embodiment includes the oscillation circuit 100, which generates an oscillation clock signal (reference clock described above) for generating a transmission clock signal (signal having carrier wave frequency) for a transmission signal, and the serial interface 251 receives the serial signal from the controller 10 during the oscillation activation period $t_{XTAL}$, in which the oscillation circuit 100 causes the oscillation piece 50 to oscillate.

More specifically, the serial interface 251 may receive the transmission action setting information from the controller 10 during the oscillation activation period $t_{XTAL}$, in which the oscillation circuit 100 causes the oscillation piece 50 to oscillate. The reception operation corresponds to the portion labeled with "transmission action setting information" in FIG. 6, and the transmission action setting information is received during the $t_{XTAL}$ period in the communication using the terminals TSCK and TSDIO.

In a case where the time required to receive the transmission action setting information is much longer than $t_{XTAL}$, even when the reception of the transmission action setting information is initiated during the period $t_{XTAL}$, the PLL circuit 210 cannot start operating after all before the reception of the transmission action setting information is completed, resulting in an insufficient effect from a viewpoint of shorter action period (accompanied by lower power consumption). Specifically, the PLL circuit 210 waits for the completion of the reception of the transmission action setting information even after the oscillation piece 50 starts oscillating.

In this regard, in the present embodiment, in which the transmission action setting information is received in the communication using the serial interface 251 (communication using SPI, for example) as described above, the transmission rate is on the order of MHz, which is a relatively high transmission rate. Activating the oscillation of the oscillation piece 50 concurrently with receiving the transmission action setting information therefore allows very efficient action.

From the same point of view, the effect of efficient action is insufficient also in a case where the period $t_{XTAL}$ is much longer than the time required for the reception of the transmission action setting information. To avoid the situation, allowing the oscillation piece 50 to oscillate quickly is preferably taken into account as well as the high-speed communication of the transmission action setting information. This point will be described later with reference to FIG. 9.

After the oscillation circuit 100 starts supplying the oscillation clock signal and the serial interface 251 completes the reception of the transmission action setting information, the PLL circuit 210 is ready to operate. At this point, 1 is written to PLL_EN (data address for enabling and disabling the PLL circuit 210) in the setting register 150 in the communication using the serial interface 251, as shown in FIG. 6. Specifically, the controller 10 sends a write command to the setting register 150, and the circuit device 20 receives the command via the serial interface 251 and performs the writing to the setting register 150.

When 1 is written to PLL_EN, the state transitions to PLL-Active, where the PLL circuit 210 is activated. After the PLL circuit 210 is locked at a predetermined frequency, the state transitions to Transmitter Active, where a transmission signal is used to start transmitting transmission data.

It is, however, noted that although the reception of the transmission action setting information ensures acquisition of information that at least allows the PLL circuit 210 to start operating (information on carrier wave frequency, for example), a variety of setting data are still required to start actually outputting the transmission signal. The variety of setting data, for example, include which mode is used, the synchronous mode or the asynchronous mode, in the reception of transmission data using the second serial interface 252 and what code format is used at the time of transmission.

Further, there is a possibility of change in the carrier wave frequency and the modulation method during single action of the circuit device 20, for example, in a case where communication using a given frequency fails or a case where the user performed operation of instructing a change in the frequency. In these cases, it is desirable to allow the state to return to PLL-Active again and the frequency setting to be changed even after the state transitions to Transmitter Active. The "single action" used herein represents action from the supply of electric power to the controller 10 and the circuit device 20 through output of transmission data to returning to Power down again after the output is completed. A variety of methods of transition from Transmitter active state to Power down state are conceivable. For example, EN may be caused to fall in Transmitter Active state to turn off the power amplifier 220 so that the state transitions to PLL-Active, and after the state transitions to PLL-Active and a predetermined period elapses, the state may transition to Power down.

In the present embodiment, information that allows a predetermined number of candidates of the carrier wave frequency and candidates of the modulation method to be set is received as the transmission action setting information, and one of the candidates of each of the frequency and the method to be used is determined based on a transmission command that follows. When the transmission command is received, additional information that allows setting of the synchronous/asynchronous modes described above and other factors may further be received.

In this case, the following procedure is employed: In the PLL-Active phase, an arbitrary setting (one of the frequency candidates contained in the transmission action setting information, for example) is temporarily used; the transmission command is then received; the PLL circuit 210 is locked at a frequency used to output an actual transmission signal; and the transmission is then initiated.

That is, when the serial interface 251 receives the instruction to start transmitting transmission data from the controller 10, the second serial interface 252 receives the transmission data. Specifically, the second serial interface 252 may receive the transmission data via the input terminal TXDAT, as described above. As seen from FIG. 6, in the present embodiment, in the preparation phase before the transmission is actually initiated (setting information reception phase), the serial interface 251 is used to perform the communication between the controller 10 and the circuit device 20, and in the actual transmission signal output phase, the second serial interface 252 is used to perform the communication. In the transition from the preparation phase (PLL-Active) to the output phase (Transmitter Active), the serial interface 251 receives the transmission start instruction, as shown in FIG. 6.

More specifically, in the circuit device 20 according to the present embodiment, the serial interface 251 receives the transmission command from the controller 10 and then detects the transmission start instruction. The transmission start instruction may be an edge of the serial clock in a narrow sense.

That is, an edge of the serial clock (SCK) may be used as the transmission start instruction. The edge in this process may be a rising edge or a falling edge. The transmission command, however, needs to be received to start outputting the transmission signal, as described above. The transmission start instruction therefore needs to be detected at an edge of the serial clock after the transmission command is received. Further, after the transmission command is received, it is necessary to stabilize (lock) the PLL circuit 210 by using the information contained in the command. It is therefore desirable to receive an edge of the serial clock after the transmission command is received and time necessary for the stabilization elapses.

In the communication sequence described above, communication timing from the reception of the transmission command from the controller 10 to the actual output of the transmission signal using the transmission data will be described in detail with reference to FIG. 7, which describes the communication timing in the asynchronous mode, and with reference to FIG. 8, which describes the communication timing in the synchronous mode.

Figure 7:
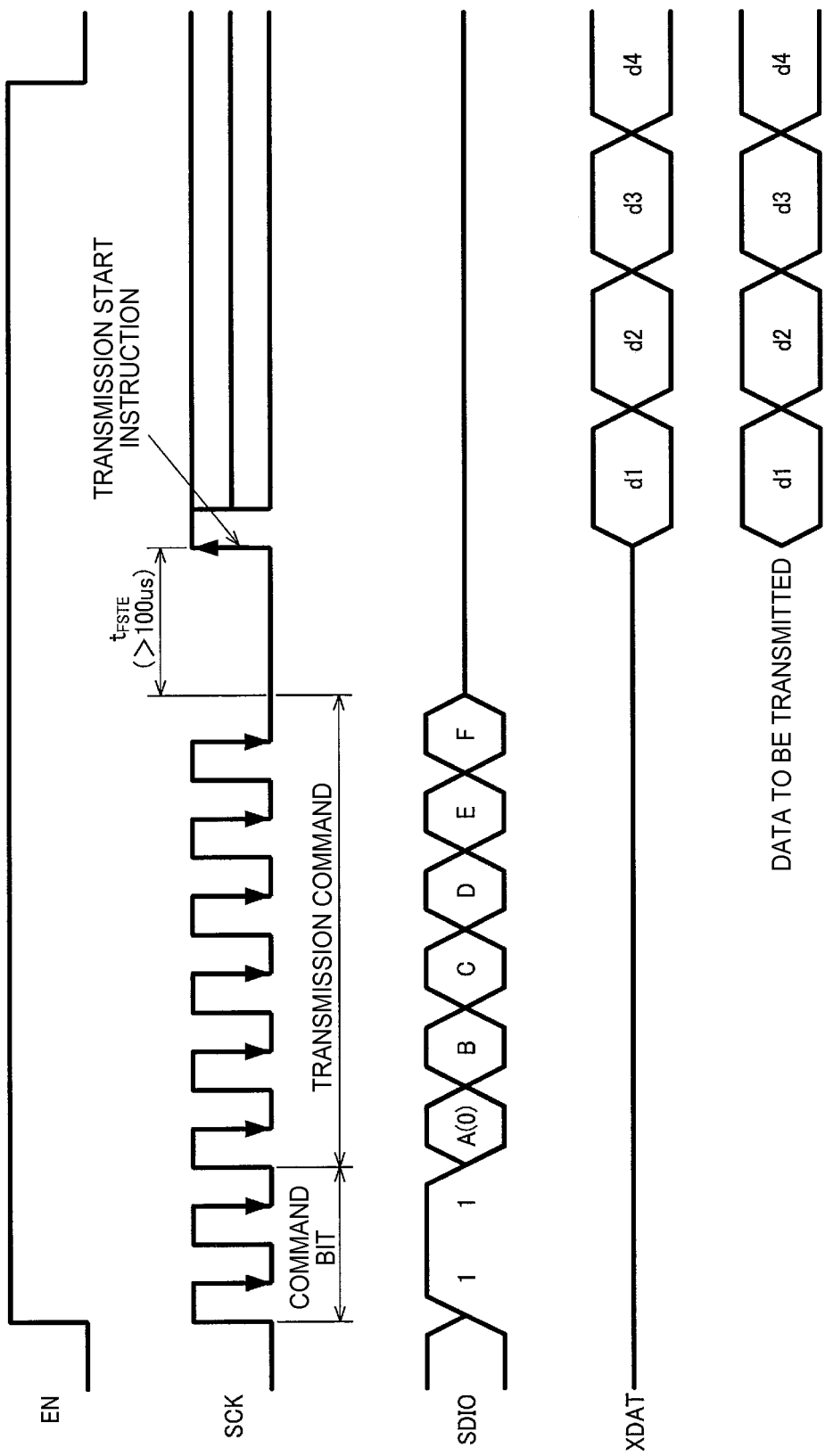
FIG. 7 shows a timing example in a case where transmission data is received and a transmission signal is outputted in an asynchronous mode.

FIG. 7 shows an example of the communication timing in a case where transmission data is received in the asynchronous mode through the input terminal TXDAT (and second serial interface 252). In this case, after Enable signal EN rises, the serial interface 251 receives the transmission command, as shown in FIG. 7. Specifically, a 2-bit command bit is received in accordance with the serial clock SCK. The point of time when the command bit is received is the same as the points of time when data is written and read to and from the setting register 150. It is, however, noted that the content of the command bit needs to differ from the content of the command bit for the writing ("01" in the example shown in FIG. 4A) and the content of the command bit for the reading ("00" in the example shown in FIG. 4B) and is set at "11" in the example shown in FIG. 7.

After the command bit, a 6-bit transmission command is received. A specific example of the transmission command is the same as that described above, and the A to F bits correspond to a bit for determining which mode is used, the synchronous mode or the asynchronous mode is used, a bit for determining the coding method, a bit for determining the carrier wave frequency, a bit for determining the modulation method, and bits for other purposes, respectively. In the example shown in FIG. 7, A is a bit that sets the synchronous mode when A is 1 and sets the asynchronous mode when A is 0. Since A=0 in FIG. 7, the asynchronous mode is selected.

After the transmission command is received, transmission data is received via the second serial interface 252. It is, however, necessary to stabilize the PLL circuit 210 by using the content determined by the transmission command as described above. In FIG. 7, no transmission signal is therefore outputted during a period $t_{FSTE}$ required for the stabilization.

As described with reference to FIG. 5, in the asynchronous mode, an XDAT signal is not latched but is directly used to generate a transmission signal (modulate carrier wave). That is, the asynchronous mode is a mode in which transmission data is directly used to generate a transmission signal. Therefore, an edge of the serial clock SCK (rising edge in the description) after the transmission command is received is used as the transmission start instruction, and XDAT starts receiving transmission data (d1 and those that follow). Since the XDAT signal is not latched, data carried and outputted by the transmission signal may be taken to have no delay with respect to XDAT.

Figure 8:
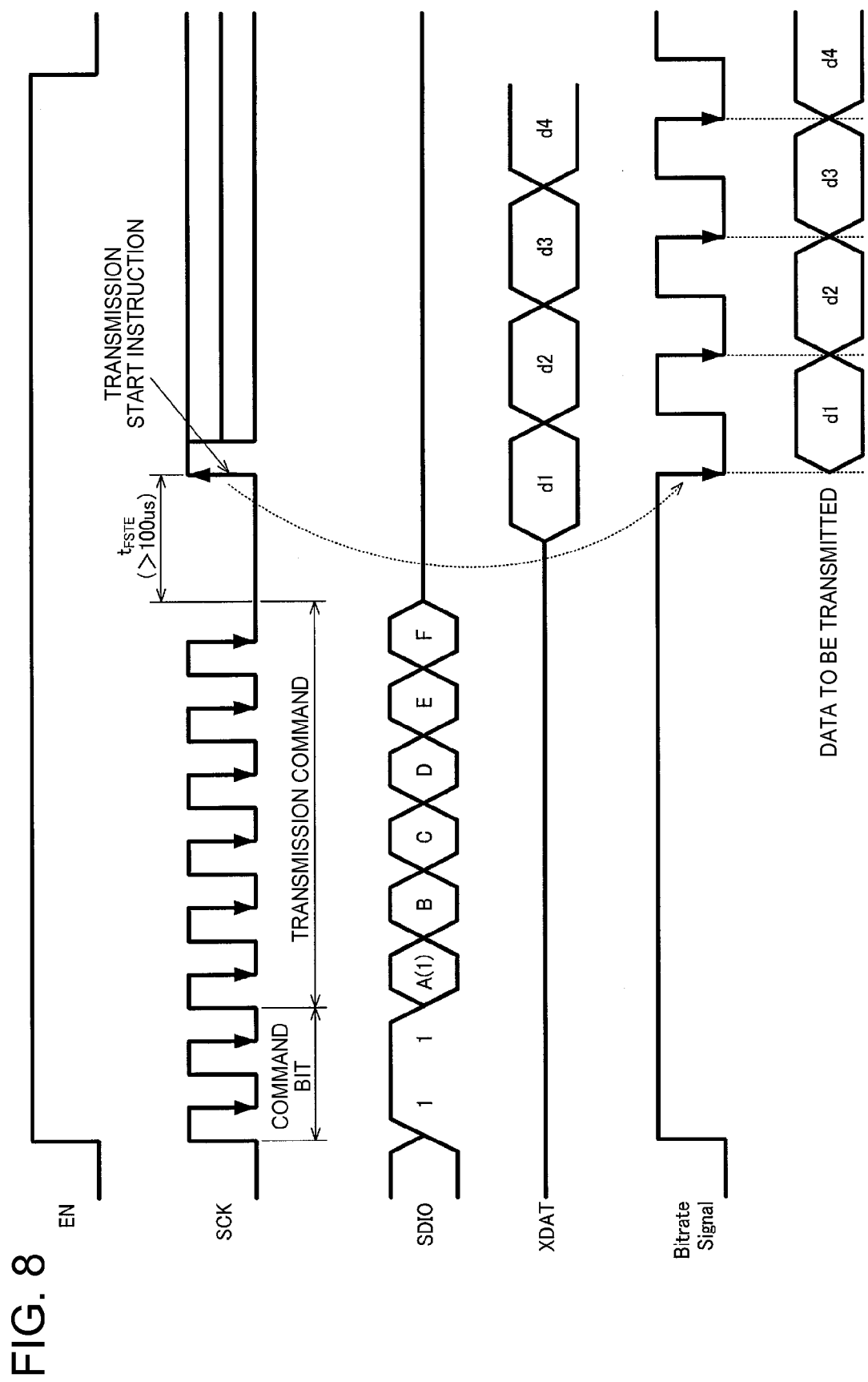
FIG. 8 shows a timing example in a case where transmission data is received and a transmission signal is outputted in a synchronous mode.

On the other hand, FIG. 8 shows a case where the synchronous mode is selected. After Enable signal EN rises, the serial interface 251 receives the 2-bit command bit and the 6-bit transmission command, as in the case where the asynchronous mode is selected. However, since A=1 in FIG. 8, the synchronous mode is selected.

In the synchronous mode, the XDAT signal is latched by using Bitrate Signal (which is the clock in the circuit device 20 and generated by dividing the output from the oscillation piece 50), and the latched signal is used to generate a transmission signal (modulate carrier wave). That is, the synchronous mode is a mode in which transmission data is regenerated by using the clock in the circuit device 20 and the generated data is used to generate a transmission signal. Specifically, an edge of the serial clock SCK after the transmission command is received is used to initialize Bitrate Signal, as shown in FIG. 8. The XDAT signal is then latched by Bitrate Signal, and the latched XDAT signal forms data to be transmitted. The reception of the transmission data in the form of XDAT and the output of the transmission data in the form of the transmission signal are therefore shifted from each other by the amount corresponding to the latching operation. In the synchronous mode, in which the clock signal with high frequency accuracy (Bitrate Signal) is used, a transmission signal with reduced jitter can be generated.

As described above, the transmission action setting information received in the form of the serial signal is information that allows setting of at least one of the frequency of the transmission clock signal for a transmission signal (frequency of carrier wave) and the modulation method used to generate the transmission signal. The transmission action setting information is not limited to the information that allows setting of the frequency itself of the transmission clock signal. For example, the transmission action setting information may instead be information that allows setting of the division ratios of a plurality of dividers provided in the PLL circuit 210 or information that allows setting of switching among the division ratios.

4. Details of Oscillation Circuit

Figure 9:
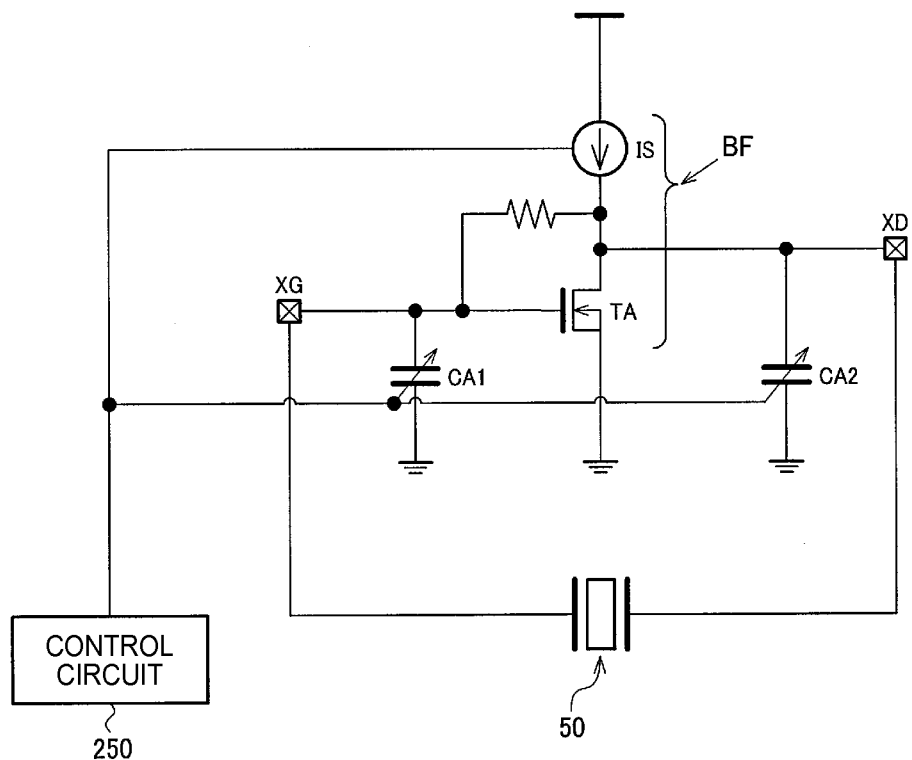
FIG. 9 shows a configuration example of an oscillation circuit.

FIG. 9 shows a configuration example of the oscillation circuit 100 provided in the circuit device 20 according to the present embodiment. The oscillation circuit 100 includes capacitance circuits for oscillation CA1 and CA2 and a buffer BF formed of a transistor TA and a current source IS (feedback buffer) and is connected to the oscillation piece 50 via terminals XG and XD, as shown in FIG. 9. To cause the oscillation piece 50 to start oscillating, a voltage pulse is supplied to the oscillation circuit 100, and the oscillation piece 50 start oscillating at a predetermined frequency in the oscillation activation period $t_{XTAL}$.

As described above, in consideration of reduction in electric power consumed by the circuit device 20 (and electronic apparatus or any other apparatus including circuit device 20), the period required for the transition from Power down to ATOSC-Active and then back to Power down shown in FIG. 6 is preferably shortened, and it is easy to shorten ATOSC-Active in the period. In ATOSC-Active, the oscillation of the oscillation piece 50 and the reception of the transmission action setting information are required, and the period required for the reception of the transmission action setting information can be shortened by using the method described above. In the following description, therefore, consider how to shorten the oscillation activation period $t_{XTAL}$.

Specifically, the oscillation circuit 100 includes the capacitance circuits for oscillation CA1 and CA2, and the capacitance of the capacitance circuits for oscillation CA1 and CA2 in the oscillation circuit 100 is set to be smaller in the oscillation activation period than in normal operation. Further, the oscillation circuit 100 includes the buffer BF, and current supply performance of the buffer BF provided in the oscillation circuit 100 is set to be greater in the oscillation activation period than in normal operation. Specifically, the amount of current from the current source IS provided in the buffer BF is set to be greater in the oscillation activation period than in normal operation.

Since the settings described above allow the oscillation piece 50 to be more readily oscillate, the oscillation activation period $t_{XTAL}$ can be shortened and the amount of electric power consumed by the circuit device 20 can be reduced accordingly. The settings described above may be achieved by the control circuit 250 in the circuit device 20. Specifically, the control circuit 250 is so configured that it can control the variable capacitance circuits CA1 and CA2 and the current source IS, as shown in FIG. 9, and controls them in such a way that the settings described above are achieved in the oscillation activation period. The normal operation used herein represents a state in which the oscillation piece 50 stably operates at a frequency determined by the characteristic thereof, specifically, a state in which the oscillation piece 50 supplies the PLL circuit 210 with the reference clock in PLL-Active and Transmitter Active in FIG. 6. That is, the normal operation represents a state in which the wireless communication is normally performed based on the carrier wave signal generated by the oscillation signal from the oscillation circuit 100.

5. Single Packaging

In the present embodiment, the circuit device 20 and the oscillation piece 50 may be integrated into a single package. In this case, the oscillation circuit 100 causes the oscillation piece 50 accommodated in the single package to oscillate.

The single package configuration allows determination of the configuration of the oscillation circuit 100 and the method in which the control circuit 240 controls the oscillation circuit 100 provided that the characteristics of the oscillation piece 50 are known. As a result, any of different oscillation pieces can be connected to the oscillation circuit 100, and the control of the oscillation circuit 100 can be optimized as compared with a case where the characteristics of an oscillation piece to be connected are not known in advance. Specifically, the setting of the capacitance of the capacitance circuits for oscillation at a small value or the setting of the current supply performance of the buffer BF at a large value in the oscillation activation period $t_{XTAL}$ as described above and other types of control can be performed in accordance with the characteristics of the oscillation piece 50, whereby the oscillation activation period $t_{XTAL}$ can be more efficiently shortened.

Figure 11:
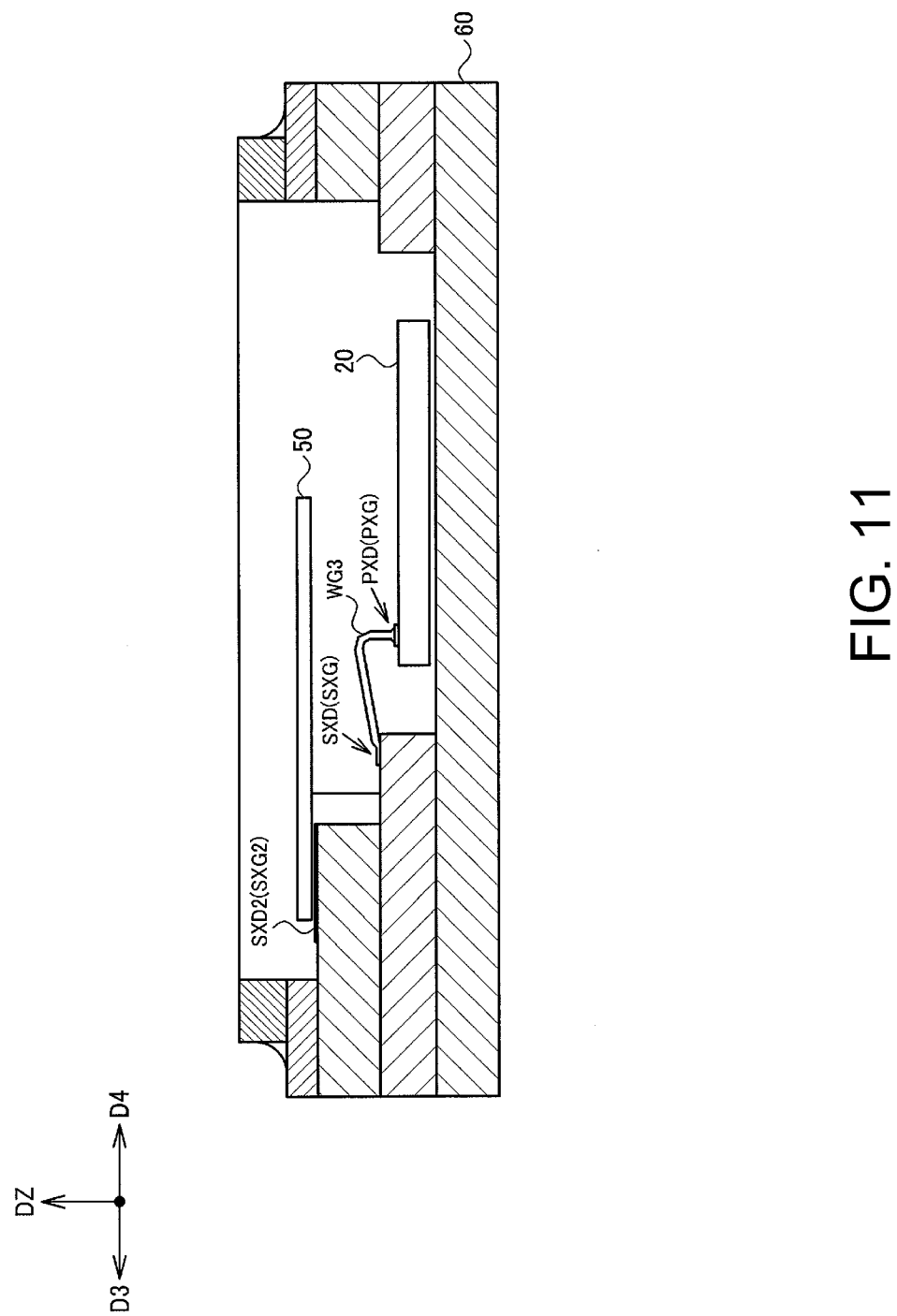
FIG. 11 shows a detailed configuration example of the package in which the oscillation piece and the circuit device are incorporated.

FIGS. 10 and 11 show a detailed configuration example of a package 60 in which the oscillation piece 50 and the circuit device 20 are incorporated. FIG. 10 is a plan view of the package 60 viewed from above (along direction DZ) with an upper lid of the package 60 open. FIG. 11 is a cross-sectional view of the package 60 viewed along a second direction D2. The direction DZ is perpendicular to first to fourth directions D1 to D4 and corresponds to the direction of a normal to a surface of a circuit substrate on which the package 60 is implemented. FIGS. 10 and 11 show a configuration in which analog signals and digital signals are unlikely to be coupled with each other as in FIG. 2, and the configuration in which the circuit device 20 and the oscillation piece 50 are integrated into a single package is not limited to the configuration described above.

In the package 60 are provided a first wire group WG1 for connecting analog pads PANA to analog terminals TANA, a second wire group WG2 for connecting digital pads PDG to digital terminals TDG, and a third wire group WG3 for connecting the oscillation piece 50 to oscillation piece pads PXG and PXD, as shown in FIG. 10.

Specifically, the first wire group WG1 connects analog pads PRFC, PPAQ, and PVSPA in the circuit device 20 to analog electrode pads SRFC, SPAQ, and SVSPA provided in the package 60. The second wire group WG2 connects digital pads PTXDAT, PEN, PSCK, PSDIO, and PSCQ in the circuit device 20 to digital electrode pads STXDAT, SEN, SSCK, SSDIO, and SCKQ provided in the package 60.

The analog electrode pads SRFC, SPAQ, and SVSPA and the digital electrode pads STXDAT, SEN, SSCK, SSDIO, and SSCKQ, are connected to the analog terminals TRFC, TPAQ, and TVSPA and the digital terminals TXDAT, TEN, TSCK, TSDIO, and TCKQ via in-package wiring lines in the package 60.

In the package 60 is further provided a wire group for connecting power supply pads PVDD and PVSS in the circuit device 20 to power supply electrode pads SVDD and SVSS in the package 60. The power supply electrode pads SVDD and SVSS are connected to power supply terminals TVDD and TVSS via in-package wiring lines in the package 60.

The oscillation piece 50 is connected to the oscillation piece pads PXG and PXD via the third wire group WG3 and in-package wiring lines in the package 60.

That is, the third wire group WG3 connects the oscillation piece pads PXG and PXD in the circuit device 20 to first oscillation piece electrode pads SXG and SXD provided in the package 60, as shown in FIG. 11. The first oscillation piece electrode pads SXG and SXD are connected to second oscillation piece electrode pads SXG2 and SXD2 provided in the package 60 via in-package wiring lines. The second oscillation piece electrode pads SXG2 and SXD2 are connected to terminals of the oscillation piece 50 with a conductive adhesive.

According to the embodiment described above, the first wire group WG1 for the analog signals extends outward from a first side HS1 of the circuit device 20 and is connected to the corresponding electrode pads in the package 60, and the second wire group WG2 for the digital signals extends outward from a second side HS2 of the circuit device 20 and is connected to the corresponding electrode pads in the package 60. As a result, bonding wires for the analog signals and bonding wires for the digital signals extend away from each other in opposite directions, and electrode pads located at the front ends of the bonding wires and package wiring lines that connect the electrode pads to terminals are also provided in positions further away from the bonding wires on an analog/digital basis.

Further, the third wire group WG3 for the oscillation piece extends outward from a third side HS3 of the circuit device 20 and is connected to the corresponding electrode pads in the package 60. As a result, bonding wires for the oscillation piece extend away from the bonding wires for the analog signals (the wires do not intersect each other but extend in directions intersecting each other), and electrode pads located at the front ends of the bonding wires for the oscillation piece and package wiring lines that connect the electrode pads to terminals also extend away from the electrode pads and the package wiring lines for the analog signals.

As described above, the analog, digital, and oscillation piece signals originate from the circuit device and travel outward away therefrom, resulting in a configuration in which coupling between the analog signals and the digital signals is very unlikely to occur inside and outside the package 60.

Further, providing the in-package wiring lines for connecting the oscillation piece 50 to the oscillation piece pads PXG and PXD allows the circuit device 20 and the oscillation piece 50 to be efficiently arranged in the package 60, whereby the size of the package 60 can be reduced (implementation area can be reduced). Specifically, the circuit device 20 and the oscillation piece 50 can be three-dimensionally arranged in the package 60 as will be described below.

That is, the oscillation piece 50 is so disposed that it overlaps with the circuit device 20 in the package 60 in a plan view thereof, as shown in FIGS. 10 and 11.

Specifically, the oscillation piece 50 and the circuit device 20 are arranged at different heights from the bottom surface of the package 60 (in different positions in direction DZ) so that the oscillation piece 50 is not in contact with the circuit device 20. In FIG. 11, the oscillation piece 50 is allowed to oscillate. In the plan view, the oscillation piece 50 and the circuit device 20 can overlap with each other by an arbitrary amount. For example, the oscillation piece 50 may overlap with part of the circuit device 20 as shown in FIG. 10, or the oscillation piece 50 may entirely fall within the circuit device 20 in the plan view. The portion of the oscillation piece 50 that overlaps with the circuit device 20 is basically, but not necessarily, part of the oscillation piece 50.

The arrangement of the oscillation piece 50 and the circuit device 20 at different heights is achieved by shaping ceramic sheets. For example, a first-layer sheet on which the circuit device 20 is disposed is provided, and frame-shaped second-layer and third-layer sheets that surround the circuit device 20 are provided on the first-layer sheet. The oscillation piece 50 is then disposed on the third-layer sheet. The first electrode pads SXD and SXG for the oscillation piece are provided, for example, on the second-layer sheet, and in-package wiring lines are so provided that they extend from the first electrode pads SXD and SXG to the second electrode pads SXD2 and SXG2 on the third-layer sheet.

As described above, the oscillation piece 50 and the circuit device 20 can be so arranged that they overlap with each other in a plan view, whereby the oscillation piece 50 can be integrated with the circuit device 20 into a single package, and the implementation area of the package 60 can be reduced. Further, even with the oscillation piece 50 built in the package 60, the wiring lines between the oscillation piece 50 and the circuit device 20 are simply configured (routed around by a small degree), contributing to suppression of crosstalk in the package 60. Moreover, integrating the oscillation piece 50 with the circuit device 20 into a single package eliminates a need to provide a wiring line that carries an oscillation signal on the implementation substrate. Since the longer a wiring line, the greater the amount of radiation from the wiring line, a short wiring line capable of transmitting the oscillation signal in the package 60 contributes to reduction in EMC noise radiated from the wiring line that carries the oscillation signal.

6. Setting Register

The circuit device 20 may include the setting register 150, to which the transmission action setting information received in the form of a serial signal, is written, as shown in FIG. 3 and other figures. Since the transmission action setting information is written to the setting register 150, information that allows setting of the frequency of the transmission clock signal for the transmission signal and information that allows setting of the modulation method are written to the setting register 150.

Specifically, the setting register 150 has a region to which data on the fractional division and the integer division performed by the PLL circuit 210 is written. When a plurality of candidates of the frequency are set in the transmission action setting information as described above, the region in the setting register 150 is formed of regions the number of which is equal to the number of candidates. The setting register 150 further has regions to which data for determining which of a variety of modulation methods, such as ASK and FSK, data for setting the modulation width in a case where FSK is used, and data for setting the power in a case where ASK is used (such as output power range of power amplifier 220) are written as information that allows setting of the modulation method.

Further, other pieces of information may be written to the setting register 150. For example, a command associated with the state transition may be written to the setting register 150. For example, the setting register 150 allows a value to be written to PLL_EN, as shown in FIG. 6. When 1 is written to the address corresponding to PLL_EN, ATOSC-Active may be caused to transition to PLL-Active. In addition, information on error sensing can be written to the setting register 150. A variety of different pieces of information can thus be stored in the setting register 150.

7. Application Examples of Present Embodiment

The method according to the present embodiment described above is not necessarily applied to the circuit device 20. For example, the method according to the present embodiment is applicable to a transmission module which includes the circuit device 20 and the controller 10 described above and in which the controller 10 has an output terminal connected to the input terminal TXDAT (corresponding to TST in FIG. 2).

Figure 12:
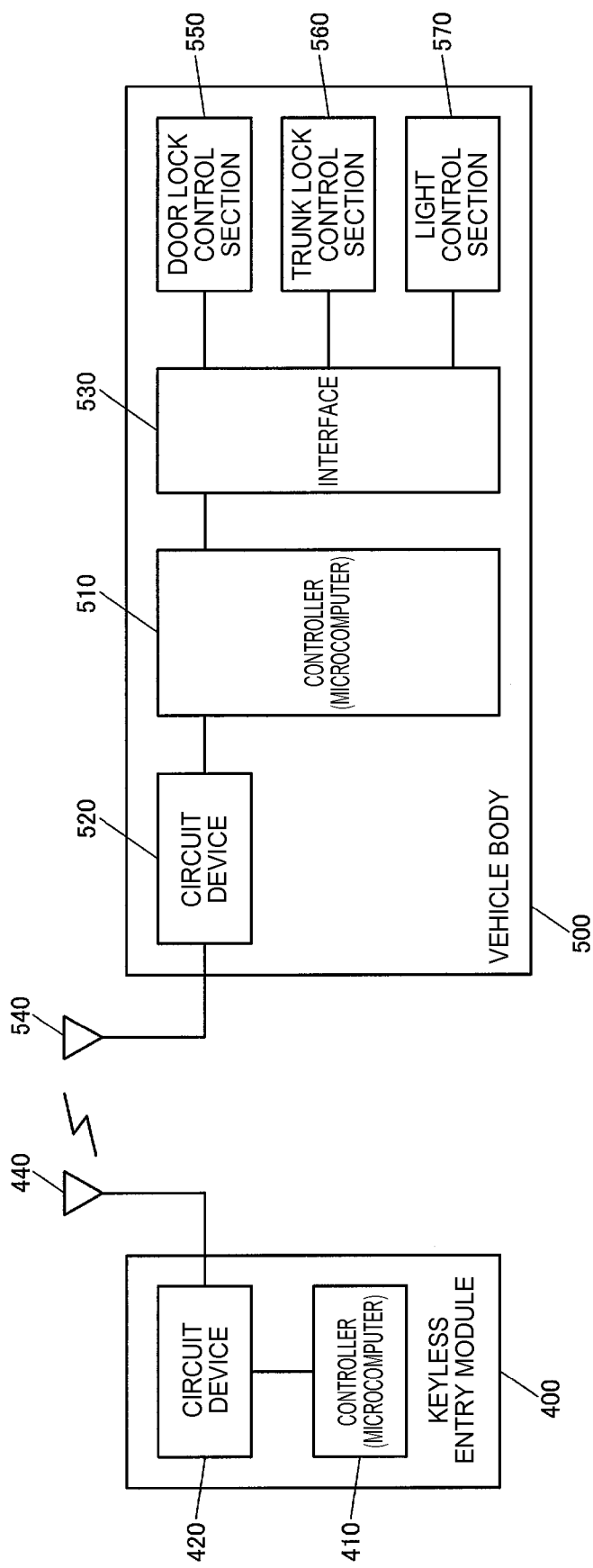
FIG. 12 shows a configuration example of an electronic apparatus.

The method according to the present embodiment is also applicable to an electronic apparatus including the circuit device 20. FIG. 12 shows a configuration example of the electronic apparatus. In the following sections, a description will be made with reference to a case where the electronic apparatus is a keyless entry system. The circuit device 20 according to the present embodiment can also be used in a variety of other electronic apparatus.

The keyless entry system includes a keyless entry module 400 and a vehicle body 500. The keyless entry module 400 includes a transmission antenna 440, a circuit device 420, which transmits a wireless radio wave via the antenna 440, and a controller 410 (microcomputer), which controls the wireless transmission. The vehicle body 500 includes a reception antenna 540, a circuit device 520 (wireless receiver, RF receiver), which receives the wireless radio wave via the antenna 540, a controller 510 (microcomputer), which controls processing and other types of operation based on the wireless radio wave reception and received data, an interface 530, which connects the controller 510 to each portion in the vehicle body 500, a door lock control section 550, which controls locking and unlocking of doors, a trunk lock control section 560, which controls locking and unlocking of a trunk, and a light control section 570, which controls turning-on, turning-off, and blinking of lights (such as winker lights and headlights).

The keyless entry module 400 is provided with buttons and other components that are not shown. When a user operates any of the buttons, information on the operation is notified to the vehicle body 500 via the wireless communication. The controller 510 then interprets the information on the operation to perform locking or unlocking of the doors or the trunk and cause the winker lights to blink or otherwise illuminate to notify the user of the locking or unlocking.

The circuit device 420 in FIG. 12 corresponds to the circuit device 20 according to the present embodiment. That is, the entire keyless entry system shown in FIG. 12 may be taken, but not necessarily, as the electronic apparatus according to the present embodiment. Instead, the keyless entry module 400 shown in FIG. 12 may alone be taken as the electronic apparatus according to the present embodiment.

Figure 13:
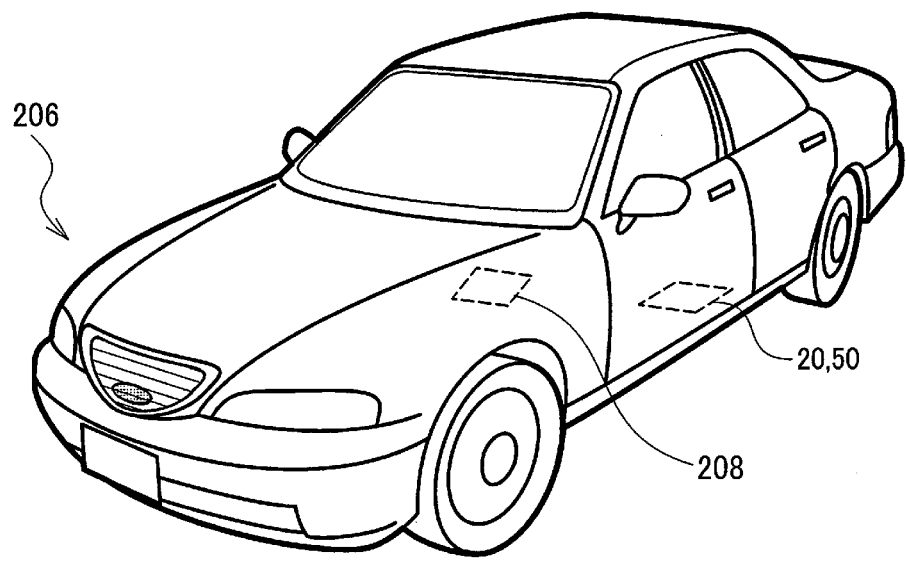
FIG. 13 shows a configuration example of a moving object.

The method according to the present embodiment is also applicable to a moving object including the circuit device 20 described above. FIG. 13 shows an example of the moving object. The circuit device 20 according to the present embodiment can be incorporated, for example, in an automobile, an airplane, a motorcycle, a bicycle, a ship, or a variety of other moving objects. The moving object is, for example, an apparatus/instrument that includes an engine, a motor, or any other drive mechanism, a steering wheel, a tiller, or any other steering mechanism, and a variety of electronic apparatus and moves on the ground, in the air, and on the sea.

FIG. 13 schematically shows an automobile 206 as a specific example of the moving object. In the automobile 206 are incorporated a wireless communication device including the oscillation piece 50 and the circuit device 20 and an ECU 208, which controls each portion of the automobile 206 (engine, brake, air conditioner, and motorized window, for example). Another wireless communication device is connected to the ECU 208, and the ECU 208 controls the automobile 206 based on information received via the wireless communication device. Instead, the ECU 208 transmits control information to the wireless communication device and controls a device connected to the wireless communication device. For example, a sensing signal carrying a sensed room temperature or any other piece of information may be acquired and transmitted from the wireless communication device to the ECU 208. Instead, an instruction to unlock a door may be transmitted from the ECU 208 to the wireless communication device. Using the wireless communication as described above allows harness-less communication, whereby communication beyond a movable portion where it is difficult to install a harness, omission of harness installation in a manufacturing step, and other advantageous effects are achieved.

The present embodiment has been described above in detail, and a person skilled in the art will readily appreciate that a large number of variations are conceivable to the extent that they do not substantially depart from the novel items and advantageous effects of the invention. Such variations are all therefore assumed to fall within the scope of the invention. For example, a term described at least once in the specification or the drawings along with a different term having a boarder meaning or the same meaning can be replaced with the different term anywhere in the specification or the drawings. Further, any combination of the present embodiment and the variations fall within the scope of the invention. Moreover, the configuration, operation, and other factors of each of the circuit device, the transmission module, the package, the electronic apparatus, the moving object, and other components are not limited to those described in the present embodiment, and a variety of changes can be made thereto.

The entire disclosure of Japanese Patent Application No. 2014-147882, filed Jul. 18, 2014 is expressly incorporated by reference herein.

What is claimed is:
1. A circuit device comprising:
a first serial interface that receives a serial signal transmitted from a controller at a first communication speed;
a transmission data input terminal that receives transmission data transmitted from the controller at a second communication speed slower than the first communication speed;
a second serial interface that receives the transmission data via the transmission data input terminal;
a selector that receives the serial signal from the first serial interface and the transmission data from the transmis- sion data input terminal so as to select one of the serial signal and transmission data and output an selected signal;
a latch circuit that receives the selected signal from the selector and outputs a latched signal; and
a transmission circuit that outputs a transmission signal based on the latched signal,
wherein the second serial interface has the selector and the latch circuit.

2. The circuit device according to claim 1, further comprising an oscillation circuit that generates an oscillation clock signal for generating a transmission clock signal for the transmission signal,
wherein the first serial interface receives the serial signal in an oscillation activation period of the oscillation circuit.

3. The circuit device according to claim 2,
wherein the oscillation circuit includes a capacitance circuit for oscillation, and
the capacitance circuit for oscillation has capacitance smaller than capacitance in normal operation in the oscillation activation period.

4. The circuit device according to claim 2,
wherein the oscillation circuit includes a buffer, and
the buffer has current supply performance greater than current supply performance in normal operation in the oscillation activation period.

5. The circuit device according to claim 3,
wherein the oscillation circuit includes a buffer, and
the buffer has current supply performance greater than current supply performance in normal operation in the oscillation activation period.

6. The circuit device according to claim 2,
wherein the oscillation circuit includes an oscillation piece and causes the oscillation piece to oscillate.

7. The circuit device according to claim 6,
wherein the oscillation piece and the oscillation circuit are accommodated in a single package.

8. The circuit device according to claim 1,
wherein when the first serial interface receives from the controller a transmission start instruction to start transmitting the transmission data,
the second serial interface receives the transmission data.

9. The circuit device according to claim 8,
wherein the first serial interface receives a transmission command from the controller to detect the transmission start instruction.

10. The circuit device according to claim 1,
wherein the second serial interface receives the transmission data in a synchronous mode or an asynchronous mode.

11. The circuit device according to claim 1,
wherein the transmission circuit receives transmission action setting information for generating the transmission signal in the form of the serial signal and includes
a transmission waveform generator that generates a transmission waveform based on the transmission action setting information and the transmission data, and
a power amplifier that outputs the generated transmission waveform in the form of the transmission signal.

12. The circuit device according to claim 1,
wherein the circuit device receives transmission action setting information for generating the transmission signal in the form of the serial signal and further comprises a setting register to which the transmission action setting information is written.

13. The circuit device according to claim 1,
wherein the circuit device receives transmission action setting information for generating the transmission signal in the form of the serial signal, and
at least one of the frequency of a transmission clock signal for the transmission signal and a modulation method used to generate the transmission signal is set based on the transmission action setting information.

14. A transmission module comprising:
the circuit device according to claim 1; and
the controller,
wherein the controller has an output terminal connected to the transmission data input terminal.

15. An electronic apparatus comprising the circuit device according to claim 1.

16. A moving object comprising the circuit device according to claim 1.

* * * * *